(12) United States Patent
Tsukamoto

(10) Patent No.: US 11,745,544 B2
(45) Date of Patent: Sep. 5, 2023

(54) PNEUMATIC TYRE

(71) Applicant: SUMITOMO RUBBER INDUSTRIES, LTD., Hyogo (JP)

(72) Inventor: Kimikazu Tsukamoto, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 377 days.

(21) Appl. No.: 16/666,634

(22) Filed: Oct. 29, 2019

(65) Prior Publication Data

US 2020/0148005 A1 May 14, 2020

(30) Foreign Application Priority Data

Nov. 13, 2018 (JP) ................................. 2018-213105

(51) Int. Cl.
*B60C 9/22* (2006.01)
*B60C 15/06* (2006.01)

(52) U.S. Cl.
CPC ........ *B60C 9/2204* (2013.01); *B60C 15/0603* (2013.01); *B60C 2009/2223* (2013.01)

(58) Field of Classification Search
CPC .... B60C 9/18; B60C 9/20; B60C 9/22; B60C 9/2204; B60C 2009/1857; B60C 2009/2035; B60C 2009/2041; B60C 2009/2223; B60C 15/06; B60C 15/0603; B60C 2015/061; B60C 2015/0614; B29D 30/1621; B29D 30/1628; B29D 30/3021; B29D 30/3028
USPC ....................................... 152/526, 532, 533
See application file for complete search history.

(56) References Cited

U.S. PATENT DOCUMENTS 5,228,933 A * 7/1993 Kawabata ................. B60C 9/20
152/209.5
6,058,996 A 5/2000 Suzuki
(Continued)

FOREIGN PATENT DOCUMENTS

EP 0414470 8/1990
EP 0462733 6/1991
(Continued)

OTHER PUBLICATIONS

Makoto Kitayama, JP-2014015094-A, machine translation. (Year: 2014).*

(Continued)

*Primary Examiner* — Robert C Dye
*Assistant Examiner* — Sedef E Paquette
(74) *Attorney, Agent, or Firm* — GREENBLUM & BERNSTEIN, P.L.C.

(57) ABSTRACT

A pneumatic tyre includes a tread portion provided with circumferential grooves to form circumferential land portions, a belt layer, and a band layer disposed outwardly in the tyre radial direction of the belt layer. The band layer includes a first layer covering an entire width of the belt layer, and second layers disposed outwardly in the tyre radial direction of the first layer and arranged separately in a tyre axially direction from one another. Each second layer is located radially inwardly of a respective one of the circumferential land portions. In each circumferential land portion, the second layer has at least one axial edge that is away at a distance (A) of equal to or more than 3.0 mm in the tyre axial direction from a groove bottom of one of the circumferential grooves nearest to the at least one axial edge.

16 Claims, 8 Drawing Sheets

(56) References Cited

U.S. PATENT DOCUMENTS

| | | | |
|---|---|---|---|
| 8,151,841 B2 | 4/2012 | Ebiko | |
| 2004/0089392 A1* | 5/2004 | Yukawa | B60C 9/2204 |
| | | | 152/526 |
| 2009/0205763 A1* | 8/2009 | Ebiko | B60C 9/22 |
| | | | 152/209.1 |
| 2009/0314408 A1* | 12/2009 | Taguchi | C08L 7/00 |
| | | | 152/541 |
| 2014/0367012 A1* | 12/2014 | Chambriard | B60C 9/0042 |
| | | | 152/209.18 |
| 2015/0283864 A1* | 10/2015 | Niwa | B60C 13/002 |
| | | | 152/541 |
| 2019/0329594 A1* | 10/2019 | Takenaka | D02G 3/48 |

FOREIGN PATENT DOCUMENTS

| | | |
|---|---|---|
| JP | H03-082604 | 4/1991 |
| JP | 08188011 A * | 7/1996 |
| JP | H9-277803 A | 10/1997 |
| JP | 11291713 A * | 10/1999 |
| JP | 2014015094 A * | 1/2014 |

OTHER PUBLICATIONS

Nakao Y, JP-11291713-A, machine translation. (Year: 1999).*
Noda et al., JP-08188011-A, machine translation. (Year: 1996).*
The extended European Search Report, European patent Office, Application No. 19202955.1, dated Mar. 6, 2020.

* cited by examiner

PNEUMATIC TYRE

BACKGROUND ART

Field of the Disclosure

The present disclosure relates to a pneumatic tyre capable of improving flat spot resistance and high-speed durability.

Description of the Related Art

Typically, radial tyres widely employ a tread reinforcing construction that includes a belt layer and a band layer disposed outside the belt layer to improve high-speed durability (e.g. see Patent Document 1). The band layer, for example, is formed by winding spirally a tape-shaped strip which includes one or more band cords.

When a vehicle is parked for a long period, so called flat spots in which tread ground-contacting portions of the tyres are deformed into flat may occur. Flat spots in tyres may cause shimmy and the like, thus lowering vibration characteristic of tyres. So far, tread band layers may be considered as one cause of flat spots in tyres. When tyres become hot in driving, modulus of band cords decreases so that the band cords tend to be deformed easily. In such a situation, when tyres continue to receive load without moving for some time, band layers at the tread ground-contacting portions are deformed and kept in flat. This is one cause of flat spots.

PATENT DOCUMENT

[patent Document 1] Japanese Unexamined Patent Application Publication H09-277803

SUMMARY OF THE DISCLOSURE

In order to reduce or eliminate flat spots in tyres (i.e., for improving flat spot resistance), minimizing the effect of band cord deformation may be considered by reducing an amount of band cords. However, when reducing an amount of band cords simply, it may cause a problem that high-speed durability is deteriorated since binding force for belt layers is also decreased. As described above, flat spot resistance is inconsistent with high speed durability, and thus it was difficult to improve both in a high level.

The present disclosure has an object to provide a pneumatic tyre which may improve flat spot resistance and high-speed durability in a high level.

According to one aspect of the present disclosure, a pneumatic tyre includes a tread portion including circumferential land portions divided by circumferential grooves extending in a tyre circumferential direction, a pair of sidewall portions, a pair of bead portions having bead cores therein, a carcass extending between the bead cores of the pair of bead portions through the tread portion and the pair of sidewall portions, a belt layer disposed outwardly in a tyre radial direction of the carcass in the tread portion, and a band layer disposed outwardly in the tyre radial direction of the belt layer. The band layer includes a first layer covering an entire width of the belt layer, and second layers disposed outwardly in the tyre radial direction of the first layer and arranged separately in a tyre axial direction from one another. Each second layer is located inwardly in the tyre radial direction of a respective one of the circumferential land portions. In each circumferential land portion, the second layer has at least one axial edge that is away at a distance (A) of equal to or more than 3.0 mm in the tyre axial direction from a groove bottom of one of the circumferential grooves located nearest to the at least one axial edge.

In another aspect of the present disclosure, the second layers may include axially spaced two outermost second layers arranged outermost in the tyre axial direction, the outermost second layers may have respective outer edges in the tyre axial direction, and the respective outer edges of the outermost second layers may be located inwardly in the tyre axial direction at a distance (B1) from respective outer edges of the belt layer.

In another aspect of the present disclosure, the belt layer may include a first belt ply, and a second belt ply disposed outwardly in the tyre radial direction of the first belt ply and having a smaller width than that of the first belt ply, and the respective outer edges of the outermost second layers may be located inwardly in the tyre axial direction at a distance (B2) from respective outer edges of the second belt ply.

In another aspect of the present disclosure, the band layer may be formed by winding a tape-shaped band strip including one or more band cords therein spirally in the tyre circumferential direction, and at least two adjacent second band layers in the tyre axial direction may be formed by a continuous single strip of the band strip so as to include a passing-under-groove portion of the band strip that extends in a transverse direction of the one of the circumferential grooves between the adjacent second band layers.

In another aspect of the present disclosure, the band layer may be formed by winding a tape-shaped band strip including one or more band cords therein spirally in the tyre circumferential direction, and the respective second band layers may be formed using respective independent band strips so as not to include a passing-under-groove portion of the band strip that extends in a transverse direction of the one of the circumferential grooves between adjacent second band layers in the tyre axial direction.

In another aspect of the present disclosure, the bead portions may include bead apex rubbers extending outwardly in the tyre radial direction from outer surfaces of the respective bead cores, and radial heights (h) of outer edges of the bead apex rubbers from the outer surfaces of the bead cores may be in a range of from 25 to 45 mm.

In another aspect of the present disclosure, the bead portions may include clinch-apex rubbers forming outer surfaces of the respective bead portions, and the clinch-apex rubbers may have loss-tangent (tan $\delta$) at 70 degrees C. equal to or less than 0.20.

In this specification and claims, the loss tangent (tan d) of rubber is a value measured according to the provisions of JIS-K6394 under the following conditions by the use of a viscoelastic spectrometer:
initial strain: 10%,
amplitude: +/−1%,
frequency: 10 Hz,
deformation mode: tensile, and
measuring temperature: 70 degrees C.

DESCRIPTION OF THE PREFERRED EMBODIMENTS

An embodiment of the present disclosure will be explained below with reference to the accompanying drawings.

Figure 1:
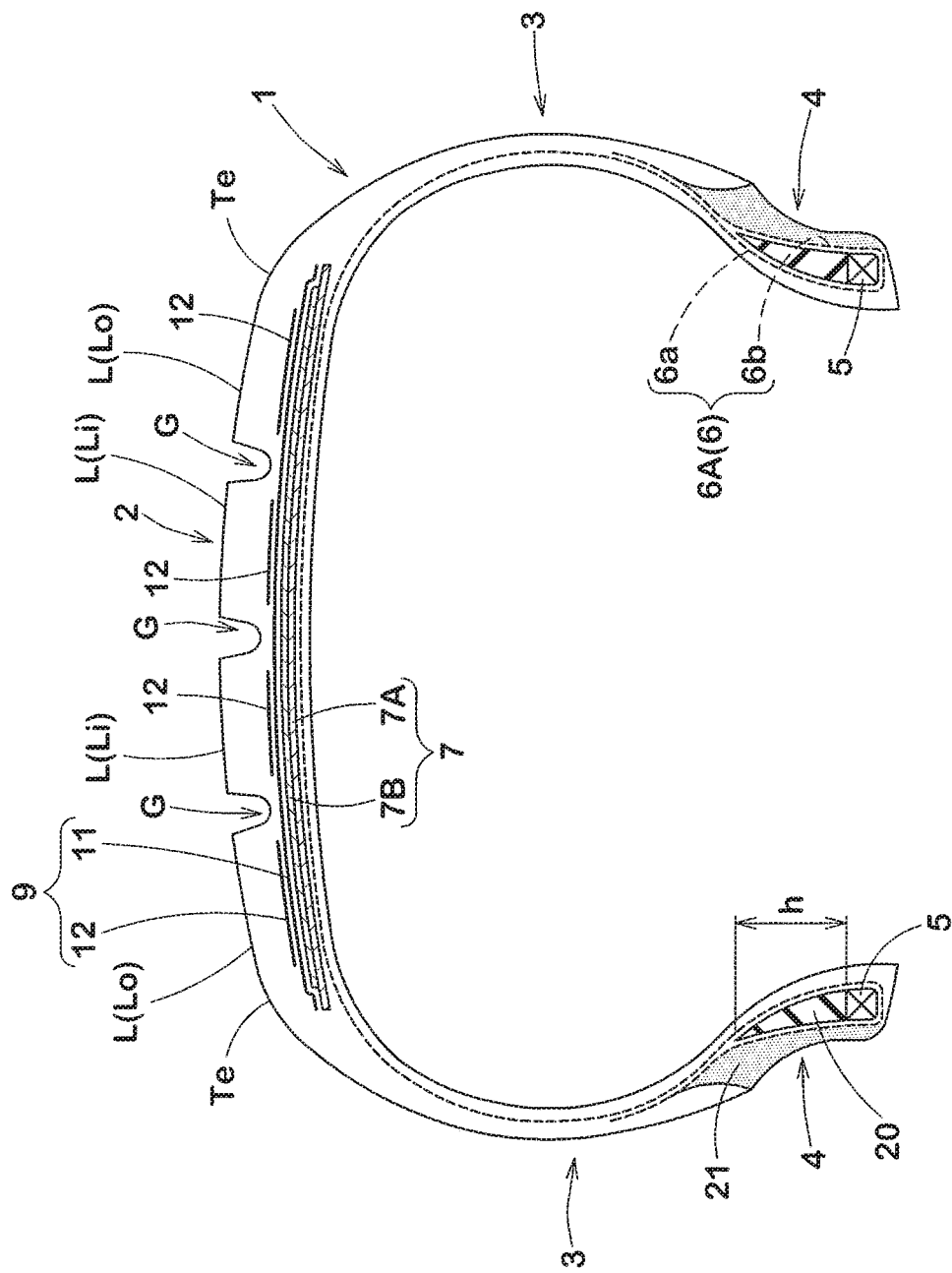
FIG. 1 is a cross-sectional view of a pneumatic tyre according to an embodiment of the present disclosure.

As illustrated in FIG. 1, a pneumatic tyre (hereinafter simply referred to as "tyre") 1 according to the present disclosure includes a tread portion 2, a pair of sidewall portions 3, a pair of bead portions 4 each with a bead core 5 therein, a carcass 6 extending between the bead cores 5 of the pair of bead portions 4 through the tread portion 2 and the pair of sidewall portions 3, a belt layer 7 disposed outwardly in the tyre radial direction of the carcass 6 in the tread portion 2, and a band layer 9 disposed outwardly in the tyre radial direction of the belt layer 7.

The tread portion 2 is provided with one or more (e.g. three in the present embodiment) circumferential grooves G extending in the tyre circumferential direction. Thus, the tread portion 2 is divided into two or more (e.g. four in the present embodiment) circumferential land portions L.

In the present embodiment, circumferential land portions L include two inner circumferential land portions Li each of which is disposed between axially adjacent circumferential grooves G and G. and two outer circumferential land portions Lo disposed between circumferential grooves G and tread edges Te. The circumferential land portions L may be configured as ribs that extend continuously in the tyre circumferential direction or block rows that include a plurality of circumferentially arranged blocks (not illustrated).

The tread edges Te are defined as axially outermost edges of the ground contacting patch of the tread portion 2 which occurs under a normal state with a standard tyre load when the camber angle of the tyre is zero. As used herein, the normal state is such that the tyre is mounted on a standard wheel rim with a standard pressure but loaded with no tyre load. The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example. The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example. In case of passenger car tyres, however, the standard pressure is uniformly defined by 180 kPa. The "standard tyre load" is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example.

The carcass 6 includes at least one (e.g. one in the present embodiment) carcass ply 6A of carcass cords which are oriented at an angle of from 75 to 90 degrees with respect to the tyre circumferential direction, for example. The carcass ply 6A includes a troidal ply main portion 6a extending between the bead cores 5, and a pair of ply turn-up portions 6b each turned up around a respective one of the bead cores 5 from axially inside to the outside of the tyre.

The belt layer 7 includes one or more belt plies of belt cords which are oriented at an angle of from 10 to 45 degrees with respect to the tyre circumferential direction, for example. In the present embodiment, the belt layer 7 includes a first belt ply 7A located radially inwardly and a second belt ply 7B located radially outwardly. A ply width of the second belt ply 7B, for example, is smaller about 10 to 20 mm than that of the first belt ply 7A, thus mitigating stress concentration on belt edges.

The band layer 9 includes a first layer 11 which is located radially inwardly and which covers the entire width of the belt layer 7, and two or more second layers 12 which are located radially outwardly and which are spaced from one another in the tyre axial direction. The first layer 11 as well as the second layers 12 include band cords which are wound spirally in the tyre circumferential direction.

The first layer 11 has an axial width equal to or more than that of the first belt ply 7A, thus covering the entire width of the belt layer 7.

The second layers 12 are located radially inwardly of the respective circumferential land portions L. That is, each second layer 12 is located inwardly in the tyre radial direction of a respective one of the circumferential land portions L.

Figure 2:
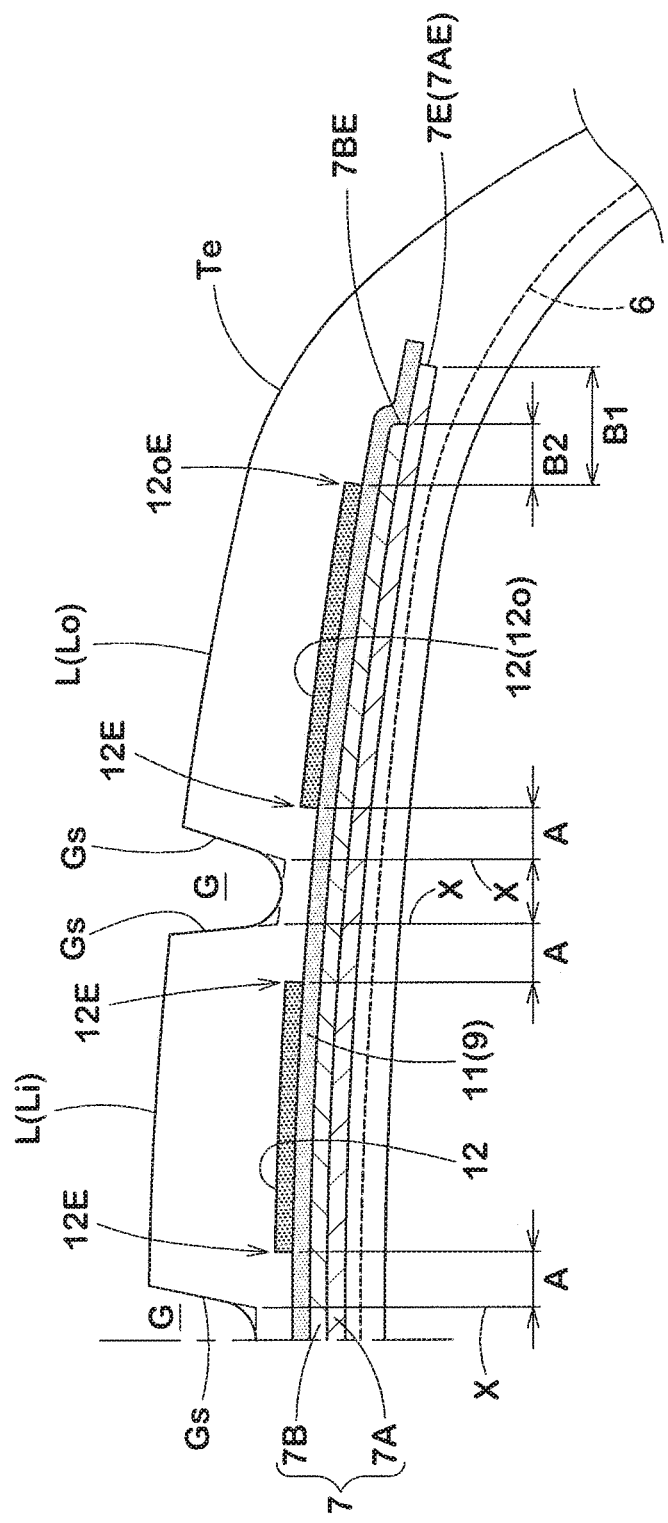
FIG. 2 is an enlarged partial cross-sectional view of a tread portion.

As illustrated in FIG. 2, in each circumferential land portion L, the second layer 12 has at least one axial edge 12E that is away at an axial distance (A) of equal to or more than 3.0 mm from a groove bottom of the circumferential groove G located nearest to the axial edge 12E. Preferably, the axial distance (A) is equal to or more than 5.0 mm.

The distance (A), strictly speaking, is a distance in the tyre axial direction from a radial reference line X to the axial edge 12E of the second layer 12 adjacent to the reference line X, wherein the radial reference line X is a radially extending line that passes a groove-bottom reference point, and wherein the groove-bottom reference point is an intersection point between an extension line of a groove wall Gs of the circumferential groove G adjacent to the axial edge 12E and a line passing the deepest location of the groove bottom and being parallel to the ground-contacting surface of the circumferential land portion L. Note that if the circumferential grooves G are formed in a zigzag manner, the reference line X is defined as a radial line that passes the outermost groove-bottom reference point in the groove-width direction in the reference points which are oscillating in the groove-width direction.

The second layers 12 include a pair of outermost second layers 12o disposed radially inwardly of the outermost circumferential land portions Lo and one or more remaining second layers between the pair of outermost second layers 12o. The outermost second layers 12o have respective outer edges 12oE in the tyre axial direction. The respective outer edges 12oE of the outermost second layers 12o are located inwardly in the tyre axial direction from respective outer edges 7E of the belt layer 7 (e.g., the respective outer edges 7AE of the first belt ply 7A in the present embodiment). In particular, the outer edge 12oE are preferably located inwardly in the tyre axial direction from respective outer edges 7BE of the second belt ply 7B.

As described above, in the band layer 9, the second layers 12 are disposed only under the ground-contacting surface of the respective circumferential land portions L which receive less strain during driving. That is, an amount of band cords is reduced in groove-inner regions located under circumferential grooves G which receive large strain during driving. This makes it possible to reduce influence of deformation of band cords, improving high speed durability while preventing occurrence of flat spots. In other words, the present embodiment enables to improve high speed durability and flat spot resistance in a high level, as compared with other reference tyres which have the same amount of band cords in the band layers as the present disclosure.

Note that when the second layers 12 are located in the groove-inner regions which receive large strain during driving, deformation of the band cords is prone to be large, and thus it may be difficult to improve flat spot resistance. Further, when the distance (A) is less than 5 mm, the axial edges 12E of the second layers 12 tend to approach the groove bottoms of the circumferential grooves G, and thus strain concentrates on the groove bottoms and cause crack thereon easily.

When the tyre 1 is grounded, large strain tends to occur on and around the outer edges 7E of the belt layer 7. Thus, it may also be effective to reduce an amount of band cords around the outer edges 7E for the benefit of improving flat spot resistance. For the above reason, it is preferable that the respective outer edge 12oE of the outermost second layers 12o are located inwardly in the tyre axial direction at a distance B1 from the respective outer edges 7E of the belt layer 7. Further, it is more preferable that the respective outer edge 12oE of the outermost second layers 12o are located inwardly in the tyre axial direction at a distance B2 from the respective outer edges 7BE of the second belt ply 7B. The distance B1 is preferably equal to or more than 12 mm, more preferably equal to or more than 17 mm. The distance B2 is preferably equal to or more than 5 mm, more preferably equal to or more than 10 mm.

Figure 3:
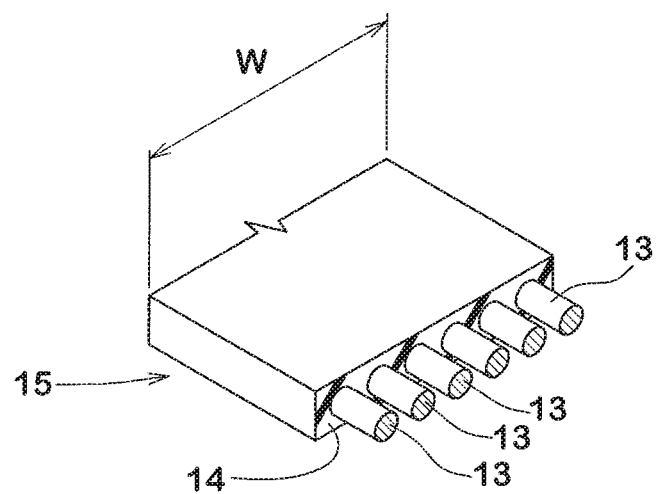
FIG. 3 is a perspective view of a band strip.

As illustrated in FIG. 3, the band layer 9 is formed by winding spirally a tape-shaped band strip 15 in the tyre circumferential direction. The band strip 15 has a flat taped-shape and includes one or more band cords 13 which are disposed at approximately equal intervals and which are coated with a topping rubber 14.

In the band layer 9 according to the first embodiment, after the first layer 11 is formed in the whole width thereof, the respective second layers 12 are formed on the first layer 11.

Figure 4:
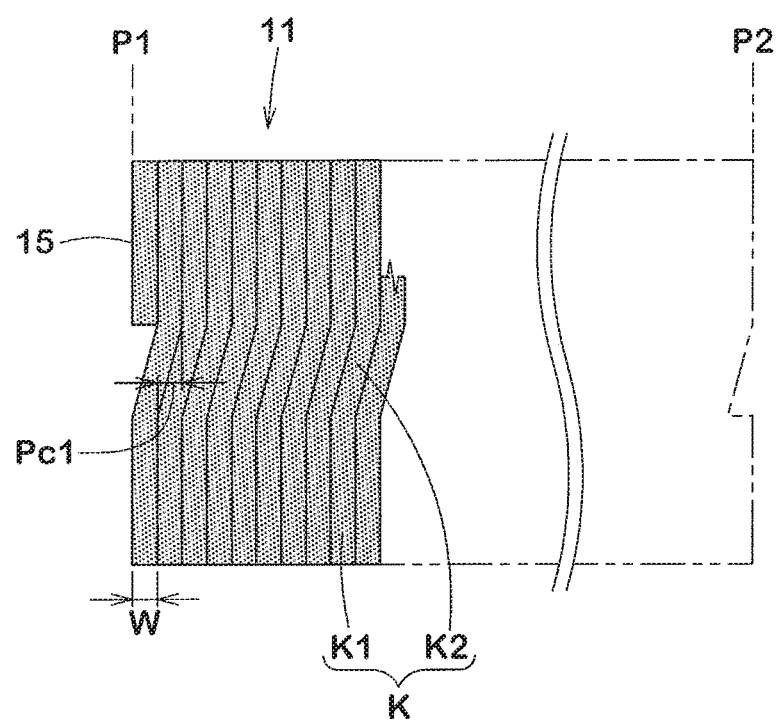
FIG. 4 is a diagram for illustrating an example of a winding condition of a band strip for a first layer of a band layer in accordance with a first embodiment.

As illustrated in FIG. 4, the first layer 11 is formed by winding the band strip 15 spirally from an axially first side edge location P1 of the first layer 11 to an axially second side edge location P2 continuously. In this process, the spiral pitches Pc1 of the band strip 15 are preferably equal to or more than 1.0 times the width W of the band strip 15 so that the adjacent winding turns of the band strip 15 do not overlap with one another. The spiral pitches Pc1 are preferably equal to or less than 2.0 times the width W of the band strip 15, more preferably equal to or less than 1.5 times. In particular, the spiral pitches Pc1 are preferably equal to the width W of the band strip 15 so that side surfaces of adjacent winding turns of the band strip 15 come into contact with one another.

In one aspect of the winding process of the band strip 15 according to the present embodiment, each winding turn K of the band strip 15 includes a circumferential portion K1 extending in parallel with the tyre circumferential direction, and an inclined portion K2 being continuous to the circumferential portion K1 and inclined at an angle with respect to the tyre circumferential direction. Here, axial deviations of the inclined portions K2 correspond to the spiral pitches Pc1.

In another aspect of the winding process which is not illustrated though, each winding turn K of the band strip 15 may consist of the inclined portion K2. Here, each winding turn K is inclined at a constant pitch angle.

Figure 5A:
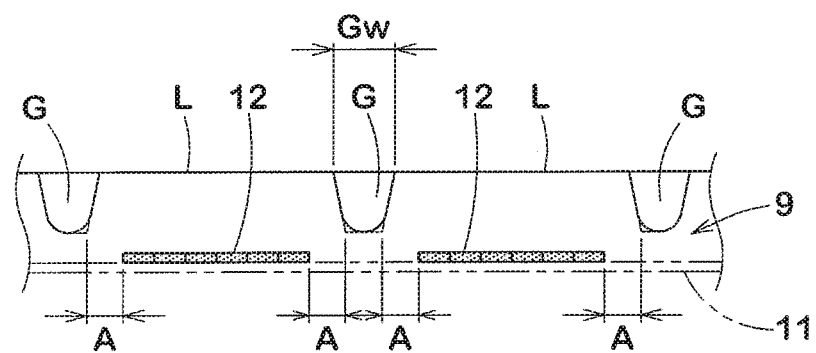
FIG. 5A and FIG. 5B are a cross-sectional view of the tread portion and a development view of second layers of the band layer, respectively, for explaining an example of a winding condition of a band strip in accordance with the first embodiment.
Figure 5B:
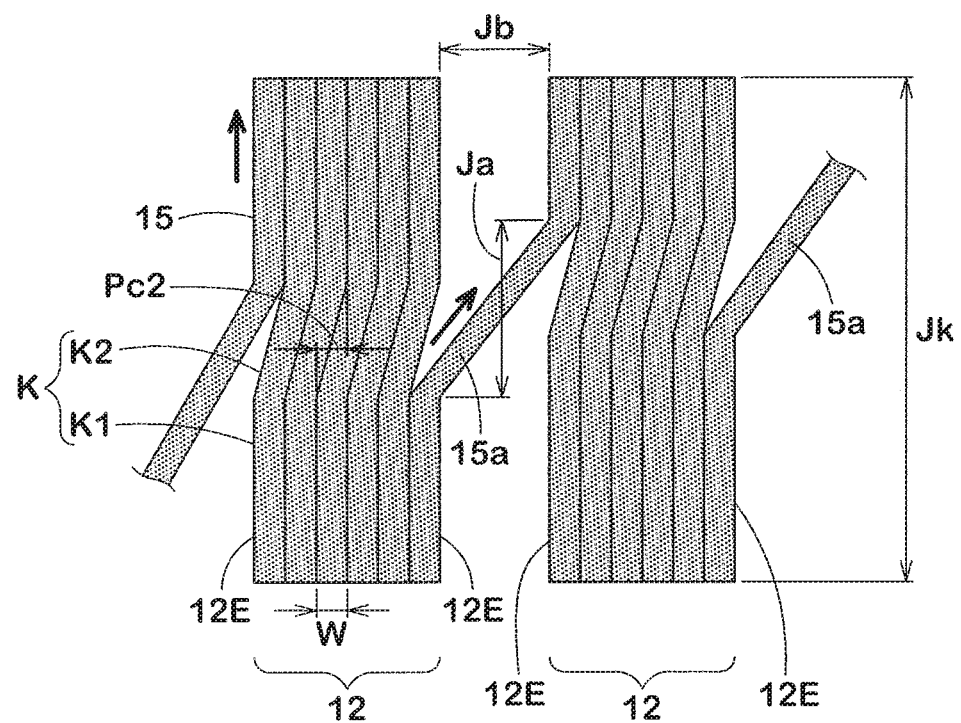

As illustrated in FIGS. 5A and 5B, in the first embodiment, the respective second layers 12 are formed by winding the band strip 15 spirally on the first layer 11 which was formed previously.

In the present embodiment, the adjacent second band layers 12 in the tyre axial direction via one of the circumferential grooves G are formed using a continuous single strip of the band strip 15. Specifically, after one of the second layers 12 (the left side layer, for example) is formed by winding the band strip 15 spirally, the band strip 15 traverses the circumferential groove G by passing under the circumferential groove G. Then, the band strip 15 is wound spirally again, thus forming the other one of the second layers 12 (the right layer, for example) continuously.

That is, the band layer 9 according to the present embodiment includes one or more passing-under-groove portions 15a of the band strip 15 between the adjacent second band layers 12 and 12. The passing-under-groove portions 15a extend in a transverse direction of the respective circumferential grooves G while passing under the respective circumferential grooves G.

The spiral pitches Pc2 of the second layers 12, same as the spiral pitches Pc1, are preferably equal to or more than 1.0 time the width W of the band strip 15 but preferably equal to or less than 2.0 times, more preferably equal to or less than 1.5 times. In particular, the spiral pitches Pc2 are equal to the width W of the band strip 15 so that side surfaces of adjacent winding turns of the band strip 15 come into contact with one another.

In contrast to the above, the passing-under-groove portions 15a of the band strip 15 preferably have a circumferential length Ja equal to or less than 40%, more preferably equal to or less than 20%, of the entire circumferential length Jk of the respective second layers 12. In addition, a length Jb in the tyre axial direction of each passing-under-groove portion 15a is approximately represented "2×A+ Gw" which is obviously greater than the spiral pitches Pc2. Thus, the passing-under-groove portions 15a are clearly distinguished from the winding turns of the respective second layers 12. Note that the reference "Gw" represents a groove width of a respective one of the circumferential grooves G.

In the second layers 12 according to the present embodiment, each winding turn K of the band strip 15 comprises the circumferential portion K1 and the inclined portion K2. In this case, the axial edges 12E of the second layers 12 are parallel to the tyre circumferential direction.

Figure 6A:
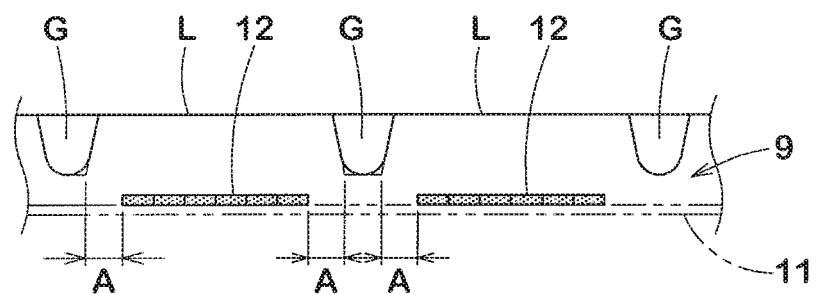
FIG. 6A and FIG. 6B are a cross-sectional view of the tread portion and a development view of second layers of the band layer, respectively, for explaining another example of a winding condition of a band strip in accordance with the first embodiment.
Figure 6B:
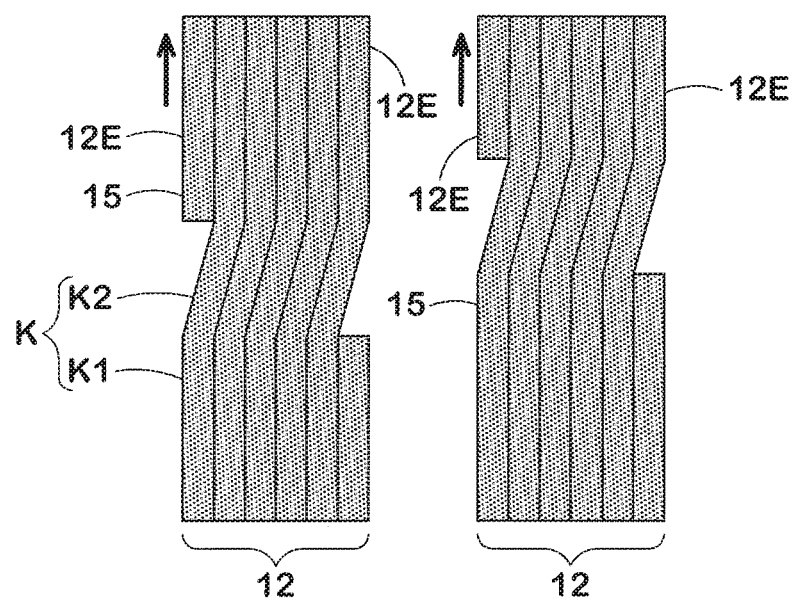

FIGS. 6A and 6B illustrate another aspect of the band layer 9 according to the first embodiment. In the present aspect, each second band layer 12 is formed using a respective independent band strip 15. In this case, no passing-under-groove portions 15a are formed.

Figure 7:
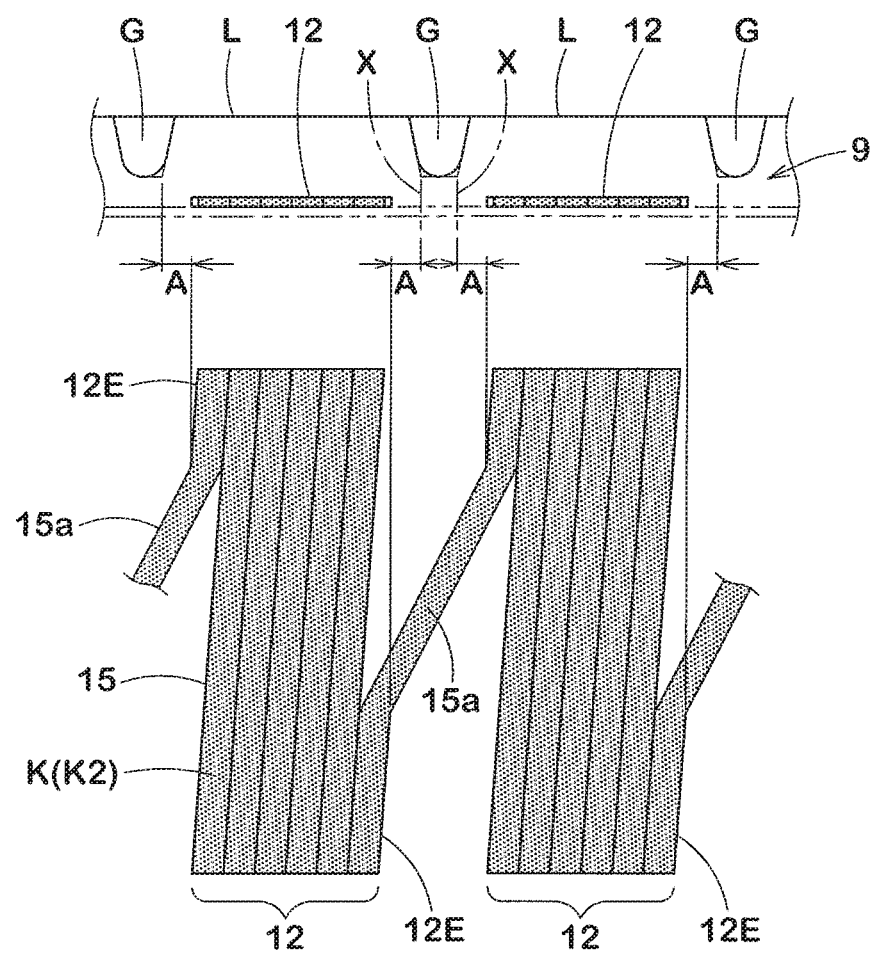
FIG. 7 is a combination diagram of a cross-sectional view of the tread portion and a development view of second layers of the band layer for illustrating yet another example of a winding condition of a band strip in accordance with the first embodiment.

FIG. 7 illustrates yet another aspect of the band layer 9 according to the first embodiment. In the present aspect, each winding turn K of each second layer 12 is formed by the inclined portion K2 only. Thus, the outer edges 12E of each second layer 12 is inclined at a constant angle with respect to the tyre circumferential direction over the entire length. In this case, the distance (A) of one of the outer edges 12E is defined as a distance between the concerned radial reference line X and the concerned outer edge 12E at a location where the outer edge 12E is nearest to the radial reference line X.

In the present aspect, passing-under-groove portions 15a are provided between adjacent second layers 12 and 12. Alternatively, same as FIG. 6, the respective second layers 12 may be formed using the respective independent band strips 15, thus enabling to eliminate the passing-under-groove portions 15a.

Figure 8A:
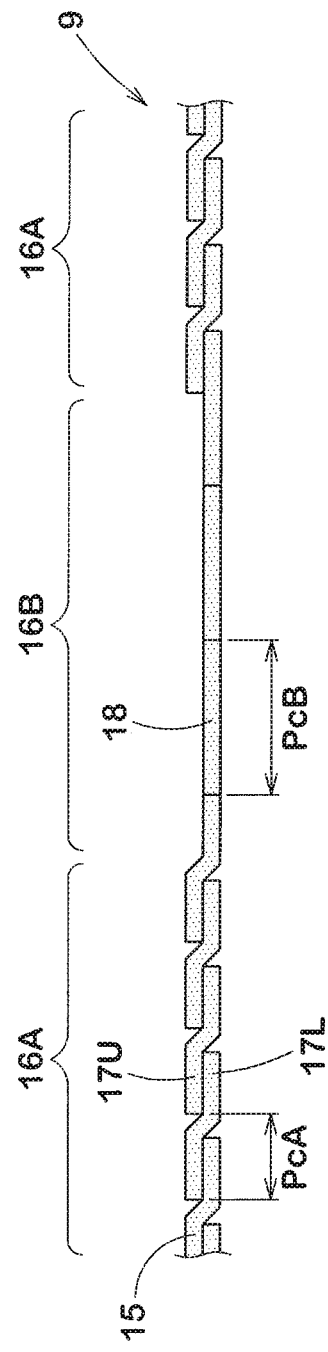
FIG. 8A is a diagram for illustrating an example of a winding condition of a band strip of the band layer in accordance with a second embodiment.
Figure 8B:
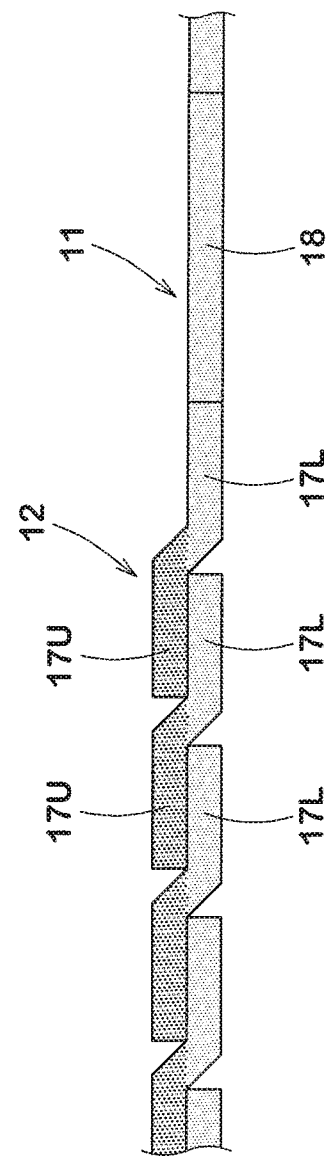
FIG. 8B is a partial enlarged view of FIG. 8A.

FIGS. 8A and 8B illustrate the second embodiment of the band layer 9. In the second embodiment, the first layer 11 and the second layers 12 are formed simultaneously by winding a single band strip 15 at different winding pitches.

Specifically, the band layer 9 includes one or more first winding regions 16A where the band strip 15 is wound at a first winding pitch PcA, and one or more second winding regions 16B where the band strip 15 is wound at a second winding pitch PcB which is relatively larger than the first winding pitch PcA.

The first winding pitch PcA is preferably equal to or more than 0.5 but less than 1.0 time the width W of the band strip 15. Thus, in the first winding regions 16A, the band strip 15 is wound such that the respective winding turns of the band strip 15 overlap with one another in the tyre radial direction. i.e., being wound to form an inner layer portion 17L and an outer layer portion 17U. In contrast with the first winding regions 16A, the second winding pitch PcB is preferably equal to or more than 1.0 time the width W of the band strip 15. Thus, in each second winding region 16B, the band strip 15 is wound such that the respective winding turns of the band strip 15 do not overlap with one another, i.e., forming a single layer portion 18 only.

Thus, the first layer 11 according to the present embodiment comprises the inner layer portions 17L of the first winding regions 17L and the single layer portion 18 of each second winding region 16B. Further, the second layers 12 comprise the upper layer portions 17U of the first winding regions 16A. In the present embodiment, it is exemplified that the first winding pitch PcA is 0.5 times the width W of the band strip 15, and that the second winding pitch PcB is 1.0 time the width W of the band strip 15.

As illustrated in FIG. 1, each bead portion 4 includes a bead apex rubber 20 and a clinch-apex rubber 21.

In each bead portion 4, the bead apex rubber 20 has a triangle cross-sectional shape and extends outwardly in the tyre radial direction from an outer surface of the bead core 5. The bead apex rubber 20 has viscoelasticity which tends to keep deformation thereof. Thus, when the tyre continues to receive deformation without moving for some time, permanent strain tends to occur in the bead apex rubber 20. In a tyre which includes a pair of bead apex rubbers 20 with larger heights, permanent strain may lead to deformation on the sidewall portions as well as the tread portion, deteriorating flat spot resistance.

In the present embodiment, in each bead portion 4, a radial height h of an outer edge of the bead apex rubber 20 from the outer surface of the bead core 5 is in a range of from 25 to 45 mm which is smaller than conventional heights. When the height h exceeds 45 mm, permanent strain of each bead apex rubber 20 has a big impact, and it may not contribute improving of flat spot resistance. On the other hand, when the height h is less than 25 mm, lateral rigidity of the tyre tends to decrease, which results in deterioration of steering stability.

In each bead portion 4, the clinch-apex rubber 21 constitutes an outer surface of a respective one of the bead portions 4. The clinch-apex rubber 21 according to the present embodiment extends outwardly in the tyre radial direction from a bead heel through the outer surface of the bead portion 4 to its outer end which is connected to a sidewall rubber.

Since the clinch-apex rubber 21, same as the bead apex rubber 20, has viscoelasticity, permanent strain tends to occur therein when it continues to receive a constant strain without moving for some time. However, it may be impossible to reduce the height of the clinch-apex rubber 21 since the clinch-apex rubber 21 has a feature to prevent the bead portion 4 from moving on a rim flange on which the tyre is mounted. Hence, as the clinch-apex rubber 21, low viscoelastic rubber having loss tangent (tan d) equal to or less than 0.20 at temperature of 70 degrees can preferably be employed. Thus, permanent strain on the clinch-apex rubber 20 can be reduced, improving flat spot resistance.

While the particularly preferable embodiments in accordance with the present disclosure have been described in detail, the present disclosure is not limited to the illustrated embodiments, but can be modified and carried out in various aspects.

EXAMPLE

Pneumatic tyres (265/50R20) having a basic structure shown in FIGS. 1 and 2 were prototyped based on the detail shown in Table 1. Then, flat sport resistance, high-speed durability, and steering stability of these test tyres were evaluated. Note that a comparative example 1 (Ref. 1) has the second layers which are disposed inwardly only a pair of axially outermost circumferential land portions (shoulder land portions).

In each test tyre, the first layer and the second layers were formed by winding a band strip spirally (Pc=W). The band strip has a width W of 10 mm, and includes ten band cords made of nylon cords which are arranged parallelly in the width direction.

Flat Spot Resistance Test:

Each test tyre was driven on a drum tester at speed of 100 km/h under the following first condition: a rim of 20×8.0 JJ; an internal pressure of 230 kPa; and vertical load of 6.5 kN. Then, in order to observe flat spot resistance of each tyre, the tyre was grounded on a plane under vertical load of 6.5 kN for 16 hours while being cooled naturally. Then, radial force variation (RFV-1, unit: N) of each test tyre was measured based on JASO C607. Then, in order to relax flat spot of the tyre, under the first condition, each tyre was driven on the drum tester for 30 minutes. After the relaxation, radial force variation (RFV-2) of each test tyre was measured again. Then the difference (RFV1−RFV2) between the RFV-1 and RFV-2 of each tyre was indicated in Table 1, using an index where the Ref. 1 is set to 100. The smaller value indicates better performance.

High-Speed Durability Test:

Each test tyre was driven on a drum tester under the following condition: a rim of 20×8.0 JJ, an internal pressure of 230 kPa; and vertical load of 7.35 kN. The driving speed of each tyre was increased by 10 km/h from an initial speed of 170 km/h every twenty minutes. Then, high-speed durability of each tyre was evaluated by the speed which is one step lower than the speed that the tyre was broken. The test results are shown in Table 1 using an index based on Ref. 1 being 100. The larger value indicates better performance.

Steering Stability Test:

Each test tyre set was mounted to four wheels of a four-wheel-drive vehicle using a rim of 20×8.0 JJ with an internal pressure of 230 kPa. Then, a driver drove the vehicle on a test course to evaluate steering stability by the driver's sense. The test results are shown in Table 1 using an index based on Ref. 1 being 100. The larger value indicates better performance.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| First layer |  |  |  |  |  | Presence |  |  |  |  |  |  |
| Second layer locations | shoulder land portions only |  |  |  |  | all circumferential land portions |  |  |  |  |  |  |
| Distance A (mm) | 0 | 0 | 5 | 6 | 8 |  |  | 6 |  |  |  | 3 |
| Distance B1 (mm) | −3 | 0 |  | 12 |  | 5 |  |  |  | 12 |  |  |
| Passing-under-groove portion |  |  |  |  |  | none |  |  |  |  |  |  |
| Bead apex height h (mm) | 40 |  |  | 30 |  |  | 45 | 25 | 50 | 20 | 30 | 30 |
| Tan d of clinch-apex rubber (@70 deg.) |  |  |  |  | 0.12 |  |  |  |  |  | 0.25 | 0.12 |
| Flat spot resistance | 100 | 90 | 115 | 120 | 125 | 105 | 110 | 125 | 105 | 125 | 105 | 110 |
| High-speed durability | 100 | 95 | 110 | 110 | 105 | 110 | 110 | 105 | 115 | 100 | 105 | 110 |
| Steering stability | 100 | 100 | 100 | 100 | 100 | 100 | 110 | 100 | 110 | 100 | 100 | 100 |

As shown in Table 1, it was confirmed that the example tyres improve flat spot resistance and high-speed durability in a high level.

What is claimed is:

1. A pneumatic tire comprising:
   a tread portion comprising circumferential land portions divided by circumferential grooves extending in a tire circumferential direction;
   a pair of sidewall portions;
   a pair of bead portions having bead cores therein;
   a carcass extending between the bead cores of the pair of bead portions through the tread portion and the pair of sidewall portions;
   a belt layer disposed outwardly in a tire radial direction of the carcass in the tread portion; and
   a band layer disposed outwardly in the tire radial direction of the belt layer;
   wherein the band layer comprises
      a first layer covering an entire width of the belt layer, and
      second layers disposed outwardly in the tire radial direction of the first layer and arranged separately in a tire axial direction from one another,
   wherein each second layer is located inwardly in the tire radial direction of a respective one of the circumferential land portions,
   wherein in each circumferential land portion, the second layer has at least one axial edge that is away at a distance (A) of equal to or more than 3.0 mm in the tire axial direction from a groove bottom of one of the circumferential grooves located nearest to the at least one axial edge,
   wherein the band layer is disposed without any portion of the second layers between opposing outer edges of each respective second layer being disposed under any of the circumferential grooves,
   wherein the belt layer comprises a first belt ply, and a second belt ply disposed outwardly from the first belt ply in the tire radial direction,
   wherein the first belt ply and the second belt ply are staggered so that the first belt ply extends further outward in the tire axial direction than the second belt ply to form a first step portion of at least one outer end of the belt layer in the tire axial direction,
   wherein at least one outer end of the first layer in the tire axial direction includes a second step portion that covers the first step portion, and
   wherein the second layers comprise at least one outermost second layer that is arranged outermost in the tire axial direction, and an outer edge of the at least one outermost second layer is located inward in the tire axial direction from the first step portion and the second step portion that are on a same side of the tread portion as the at least one outermost second layer,
   the band layer includes a tape-shaped band strip including one or more band cords therein that is spirally winded in the tire circumferential direction,
   at least two adjacent second layers in the tire axial direction that are among the second layers are formed by a continuous single strip of the band strip so as to include a passing-under-groove portion of the band strip that extends in a transverse direction of one of the circumferential grooves between the adjacent second layers, and
   the passing-under-groove portion of the band strip has a circumferential length equal to or less than 40% of an entire circumferential length of the respective adjacent second layers.

2. The pneumatic tire according to claim 1,
   wherein the second layers comprise axially spaced two outermost second layers arranged outermost in the tire axial direction,
   wherein the outermost second layers have respective outer edges in the tire axial direction, and
   wherein the respective outer edges of the outermost second layers are located inwardly in the tire axial direction at a distance (B1) from respective outer edges of the belt layer.

3. The pneumatic tire according to claim 2,
   wherein the second belt ply has a smaller width than that of the first belt ply, and
   wherein the respective outer edges of the outermost second layers are located inwardly in the tire axial direction at a distance (B2) from respective outer edges of the second belt ply.

4. The pneumatic tire according to claim 3,
wherein the circumferential land portions include at least one inner circumferential land portion disposed between adjacent circumferential grooves in the tire axial direction,
wherein the second layers of the band layer comprise one second layer located radially inwardly of the at least one inner circumferential land portion, and
wherein said one second layer has axial both edges that are away at the distance (A) in the tire axial direction from respective groove bottoms of the adjacent circumferential grooves.

5. The pneumatic tire according to claim 2,
wherein the circumferential land portions include at least one inner circumferential land portion disposed between adjacent circumferential grooves in the tire axial direction,
wherein the second layers of the band layer comprise one second layer located radially inwardly of the at least one inner circumferential land portion, and
wherein said one second layer has axial both edges that are away at the distance (A) in the tire axial direction from respective groove bottoms of the adjacent circumferential grooves.

6. The pneumatic tire according to claim 1,
wherein the bead portions comprise bead apex rubbers extending outwardly in the tire radial direction from outer surfaces of the respective bead cores, and
radial heights (h) of outer edges of the bead apex rubbers from the outer surfaces of the bead cores are in a range of from 25 to 45 mm.

7. The pneumatic tire according to claim 6,
wherein the circumferential land portions include at least one inner circumferential land portion disposed between adjacent circumferential grooves in the tire axial direction,
wherein the second layers of the band layer comprise one second layer located radially inwardly of the at least one inner circumferential land portion, and
wherein said one second layer has axial both edges that are away at the distance (A) in the tire axial direction from respective groove bottoms of the adjacent circumferential grooves.

8. The pneumatic tire according to claim 1,
wherein the bead portions comprise clinch-apex rubbers forming outer surfaces of the respective bead portions, and
wherein the clinch-apex rubbers have loss-tangent (tan d) at 70 degrees C. equal to or less than 0.20.

9. The pneumatic tire according to claim 8,
wherein the circumferential land portions include at least one inner circumferential land portion disposed between adjacent circumferential grooves in the tire axial direction,
wherein the second layers of the band layer comprise one second layer located radially inwardly of the at least one inner circumferential land portion, and
wherein said one second layer has axial both edges that are away at the distance (A) in the tire axial direction from respective groove bottoms of the adjacent circumferential grooves.

10. The pneumatic tire according to claim 1,
wherein the circumferential land portions include at least one inner circumferential land portion disposed between adjacent circumferential grooves in the tire axial direction,
wherein the second layers of the band layer comprise one second layer located radially inwardly of the at least one inner circumferential land portion, and
wherein said one second layer has axial both edges that are away at the distance (A) in the tire axial direction from respective groove bottoms of the adjacent circumferential grooves.

11. The pneumatic tire according to claim 1,
wherein the at least one outer end of the first layer extends axially outwardly beyond an outer end of the first belt ply.

12. The pneumatic tire according to claim 1,
wherein an outer end portion of the second step portion extends axially outwardly beyond an outer end of the first belt ply.

13. A pneumatic tire comprising:
a tread portion comprising circumferential land portions divided by circumferential grooves extending in a tire circumferential direction, the circumferential land portions comprising two axially spaced outer circumferential land portions each including a respective tread edge;
a pair of sidewall portions;
a pair of bead portions having bead cores therein;
a carcass extending between the bead cores of the pair of bead portions through the tread portion and the pair of sidewall portions;
a belt layer disposed outwardly in a tire radial direction of the carcass in the tread portion; and
a band layer disposed outwardly in the tire radial direction of the belt layer;
wherein the band layer comprises
a first layer covering an entire width of the belt layer, and
second layers disposed outwardly in the tire radial direction of the first layer and arranged separately in a tire axial direction from one another,
wherein each second layer is located inwardly in the tire radial direction of a respective one of the circumferential land portions,
wherein in each circumferential land portion, the second layer has at least one axial edge that is away at a distance (A) of equal to or more than 3.0 mm in the tire axial direction from a groove bottom of one of the circumferential grooves located nearest to the at least one axial edge,
wherein the second layers comprise two axially spaced outermost second layers each located inwardly in the tire radial direction of a respective one of the outer circumferential land portions,
wherein the outermost second layers have respective outer edges in the tire axial direction,
wherein the respective outer edges of the outermost second layers are located inwardly in the tire axial direction at a distance (B1) from respective outer edges of the belt layer,
wherein the distance (B1) is equal to or more than 12 mm,
wherein the belt layer comprises a first belt ply, and a second belt ply disposed outwardly from the first belt ply in the tire radial direction,
wherein the first belt ply and the second belt ply are staggered so that the first belt ply extends further outward in the tire axial direction than the second belt ply to form a first step portion of at least one outer end of the belt layer in the tire axial direction, wherein at least one outer end of the first layer in the tire axial direction includes a second step portion that covers the first step portion, wherein the outer edge of at least one of the outermost second layers is located inward in the tire axial direction from the first step portion and the second step portion that are on a same side of the tread portion as the at least one of the outermost second layers, the band layer includes a tape-shaped band strip including one or more band cords therein that is spirally winded in the tire circumferential direction, at least two adjacent second layers in the tire axial direction that are among the second layers are formed by a continuous single strip of the band strip so as to include a passing-under-groove portion of the band strip that extends in a transverse direction of one of the circumferential grooves between the adjacent second layers, and the passing-under-groove portion of the band strip has a circumferential length equal to or less than 40% of an entire circumferential length of the respective adjacent second layers.

14. The pneumatic tire according to claim 13, wherein an outer end portion of the second step portion extends axially outwardly beyond an outer end of the first belt ply.

15. A pneumatic tire comprising:

a tread portion comprising circumferential land portions divided by circumferential grooves extending in a tire circumferential direction, the circumferential land portions comprising two axially spaced outer circumferential land portions each including a respective tread edge;

a pair of sidewall portions;

a pair of bead portions having bead cores therein;

a carcass extending between the bead cores of the pair of bead portions through the tread portion and the pair of sidewall portions;

a belt layer disposed outwardly in a tire radial direction of the carcass in the tread portion; and a band layer disposed outwardly in the tire radial direction of the belt layer;

wherein the band layer comprises a first layer covering an entire width of the belt layer, and second layers disposed outwardly in the tire radial direction of the first layer and arranged separately in a tire axial direction from one another, wherein each second layer is located inwardly in the tire radial direction of a respective one of the circumferential land portions, wherein in each circumferential land portion, the second layer has at least one axial edge that is away at a distance (A) of equal to or more than 3.0 mm in the tire axial direction from a groove bottom of one of the circumferential grooves located nearest to the at least one axial edge, wherein the second layers comprise two axially spaced outermost second layers each located inwardly in the tire radial direction of a respective one of the outer circumferential land portions, wherein the outermost second layers have respective outer edges in the tire axial direction, wherein the belt layer comprises a first belt ply, and a second belt ply disposed outwardly in the tire radial direction of the first belt ply and having a smaller width than that of the first belt ply, wherein the respective outer edges of the outermost second layers are located inwardly in the tire axial direction at a distance (B2) from respective outer edges of the second belt ply, wherein the distance (B2) is equal to or more than 5 mm, wherein the first belt ply and the second belt ply are staggered so that the first belt ply extends further outward in the tire axial direction than the second belt ply to form a first step portion of at least one outer end of the belt layer in the tire axial direction, wherein at least one outer end of the first layer in the tire axial direction includes a second step portion that covers the first step portion, and wherein the outer edge of at least one of the outermost second layers is located inward in the tire axial direction from the first step portion and the second step portion that are on a same side of the tread portion as the at least one of the outermost second layers, the band layer includes a tape-shaped band strip including one or more band cords therein that is spirally winded in the tire circumferential direction, at least two adjacent second layers in the tire axial direction that are among the second layers are formed by a continuous single strip of the band strip so as to include a passing-under-groove portion of the band strip that extends in a transverse direction of one of the circumferential grooves between the adjacent second layers, and the passing-under-groove portion of the band strip has a circumferential length equal to or less than 40% of an entire circumferential length of the respective adjacent second layers.

16. The pneumatic tire according to claim 15, wherein an outer end portion of the second step portion extends axially outwardly beyond an outer end of the first belt ply.

* * * * *